United States Patent
Todd et al.

(10) Patent No.: US 7,281,084 B1
(45) Date of Patent: Oct. 9, 2007

(54) METHOD AND APPARATUS FOR MODIFYING A RETENTION PERIOD

(75) Inventors: Stephen J. Todd, Shrewsbury, MA (US); Michael Kilian, Harvard, MA (US); Tom Teugels, Schoten (BE); Frank Matthys, Lebbeke (BE); Kim Marivoet, Lovenjoel (BE)

(73) Assignee: EMC Corporation, Hopkinton, MA (US)

( * ) Notice: Subject to any disclaimer, the term of this patent is extended or adjusted under 35 U.S.C. 154(b) by 358 days.

(21) Appl. No.: 11/034,737

(22) Filed: Jan. 12, 2005

(51) Int. Cl.
*G06F 12/00* (2006.01)
*G06F 13/00* (2006.01)
*G06F 13/28* (2006.01)

(52) U.S. Cl. .................... 711/108; 707/202
(58) Field of Classification Search ............ 711/108; 707/202
See application file for complete search history.

(56) References Cited

U.S. PATENT DOCUMENTS 6,615,224 B1 9/2003 Davis
6,807,632 B1 10/2004 Carpentier et al.
2005/0160481 A1* 7/2005 Todd et al. .................... 726/30

FOREIGN PATENT DOCUMENTS

WO    WO 00/04483 A2    1/2000

OTHER PUBLICATIONS

International Search Report of International Application No. PCT/US2006/001064.
International Search Report of International Application No. PCT/US2006/001065.
Mutka et al., "Managing Personal Files Across Independent File Management Units," pp. 254-261, IEEE Computer Society, Apr. 14, 1992.

\* cited by examiner

*Primary Examiner*—Matthew Kim
*Assistant Examiner*—Edward J Dudek
(74) *Attorney, Agent, or Firm*—Wolf, Greenfield & Sacks, P.C.

(57) ABSTRACT

One embodiment is directed to the deletion of content units from a storage system. When a content unit is deleted, a reflection may be created and stored on the storage system. The reflection identifies the deleted content unit and may include additional information, such as a portion of the content of the content unit and audit information regarding the deletion of the content unit.

36 Claims, 5 Drawing Sheets

METHOD AND APPARATUS FOR MODIFYING A RETENTION PERIOD

FIELD OF THE INVENTION

The present invention relates to data storage and, more particularly, to methods and apparatus for managing the deletion of data stored on a storage system.

DESCRIPTION OF THE RELATED ART

Storage systems often have limited data storage capacity. Accordingly, data stored on a storage system is sometimes intentionally deleted to make storage space available for new data. Data may also be deleted unintentionally, for example, if a user deletes data that is still being used, believing that it is no longer needed. Additionally, data on a storage system may be deleted in an unauthorized manner by a malicious user seeking to wreak havoc on an organization's data or trying to cover up unscrupulous activities documented in the data.

SUMMARY OF THE INVENTION

One illustrative embodiment of the invention is directed to a method of deleting a content unit from a storage system. The method comprises acts of: receiving a request to delete the content unit; in response to the request, creating a reflection that identifies the content unit; storing the reflection on the storage system; and removing the content unit from the storage system. Another illustrative embodiment is directed to at least one computer readable medium encoded with instructions that, when executed on a computer system, perform the above-described method.

A further illustrative embodiment is directed to a storage system that stores a content unit. The storage system comprises: an input; and at least one controller, coupled to the input, that: receives a request to delete the content unit; in response to the request, creates a reflection that identifies the content unit; stores the reflection on the storage system; and removes the content unit from the storage system.

Another illustrative embodiment is directed to a method of processing, in a storage system, an access request for a content unit, the method comprises: in response to the access request, determining if a reflection for the content unit is stored on the storage system, the reflection indicating that the content unit previously was stored on the storage system but had been deleted. A further illustrative embodiment is directed to at least one computer readable medium encoded with instructions that, when executed on a computer system, perform the above-described method.

Another illustrative embodiment is directed to a storage system configured to process an access request for a content unit. The storage system comprises: an input; and at least one controller, coupled to the input, that: in response to the access request, determines if a reflection for the content unit is stored on the storage system, the reflection indicating that the content unit previously was stored on the storage system but had been deleted.

A further illustrative embodiment is directed to a method of managing content units on a storage system that stores a plurality of content units. The method comprises acts of: in response to a request to store a new content unit on the storage system, storing on the storage system information that identifies a time at which the new content unit is stored on the storage system; and in response to a request to delete a previously-stored content unit from the storage system, storing on the storage system a reflection that identifies the previously-stored content unit and includes information that identifies a time at which the previously-stored content unit is deleted from the storage system. Another illustrative embodiment is directed to at least one computer readable medium encoded with instructions that, when executed on a computer system, perform the above-described method.

A further illustrative embodiment is directed to a storage system configured to store a plurality of content units, comprising: at least one storage device; and at least one controller that: in response to a request to store a new content unit on the at least one storage device of the storage system, stores on the storage system information that identifies a time at which the new content unit is stored on the storage system; and in response to a request to delete a previously-stored content unit from the storage system, stores on the at least one storage device of the storage system a reflection that identifies the previously-stored content unit and includes information that identifies a time at which the previously-stored content unit is deleted from the storage system.

Another illustrative embodiment is directed to a method of managing content units on a storage system that stores the content units. The method comprises acts of: in response to a request to identify the content units that were stored on the storage system at a specified time, determining which of the content units stored on the storage system when the request was received were stored on the storage system at the specified time; and determining which content units deleted from the storage system were stored on the storage system at the specified time by examining reflections of deleted content units, each reflection identifying at least one corresponding deleted content unit and including information that identifies a time at which the at least one corresponding deleted content unit was deleted from the storage system. A further illustrative embodiment is directed to at least one computer readable medium encoded with instructions that, when executed on a computer system, perform the above-described method.

Another illustrative embodiment is directed to a storage system configured to manage content units. The storage system comprises: an input; and at least one controller that: in response to a request to identify the content units that were stored on the storage system at a specified time, determines which of the content units stored on the storage system when the request was received were stored on the storage system at the specified time; and determines which content units deleted from the storage system were stored on the storage system at the specified time by examining reflections of deleted content units, each reflection identifying at least one corresponding deleted content unit and including information that identifies a time at which the at least one corresponding deleted content unit was deleted from the storage system.

A further illustrative embodiment is directed to a method comprising acts of: in response to a request to delete from at least one storage system a first content unit that has content and a first retention period which specifies a period of time during which the first content unit is to be retained, the request being received before expiration of the first retention period, deleting the first content unit; creating a second content unit to replace the first content unit, the second content unit comprising at least some of the content of the first content unit and having a second retention period different from the first retention period; and creating a reflection for the first content unit, wherein the reflection identifies the second content unit as a replacement for the first content unit. Another illustrative embodiment is directed to at least one computer readable medium encoded with instructions that, when executed on a computer system, perform the above-described method.

A further illustrative embodiment is directed to a storage system comprising: an input; at least one controller, coupled to the input, that: in response to a request received through the input to delete from at least one storage system a first content unit that has content and a first retention period which specifies a period of time during which the first content unit is to be retained, the request being received before expiration of the first retention period, deleting the first content unit, deletes the first content unit; creates a second content unit to replace the first content unit, the second content unit comprising at least some of the content of the first content unit and having a second retention period different from the first retention period; and creates a reflection for the first content unit, wherein the reflection identifies the second content unit as a replacement for the first content unit.

DETAILED DESCRIPTION

Figure 1:
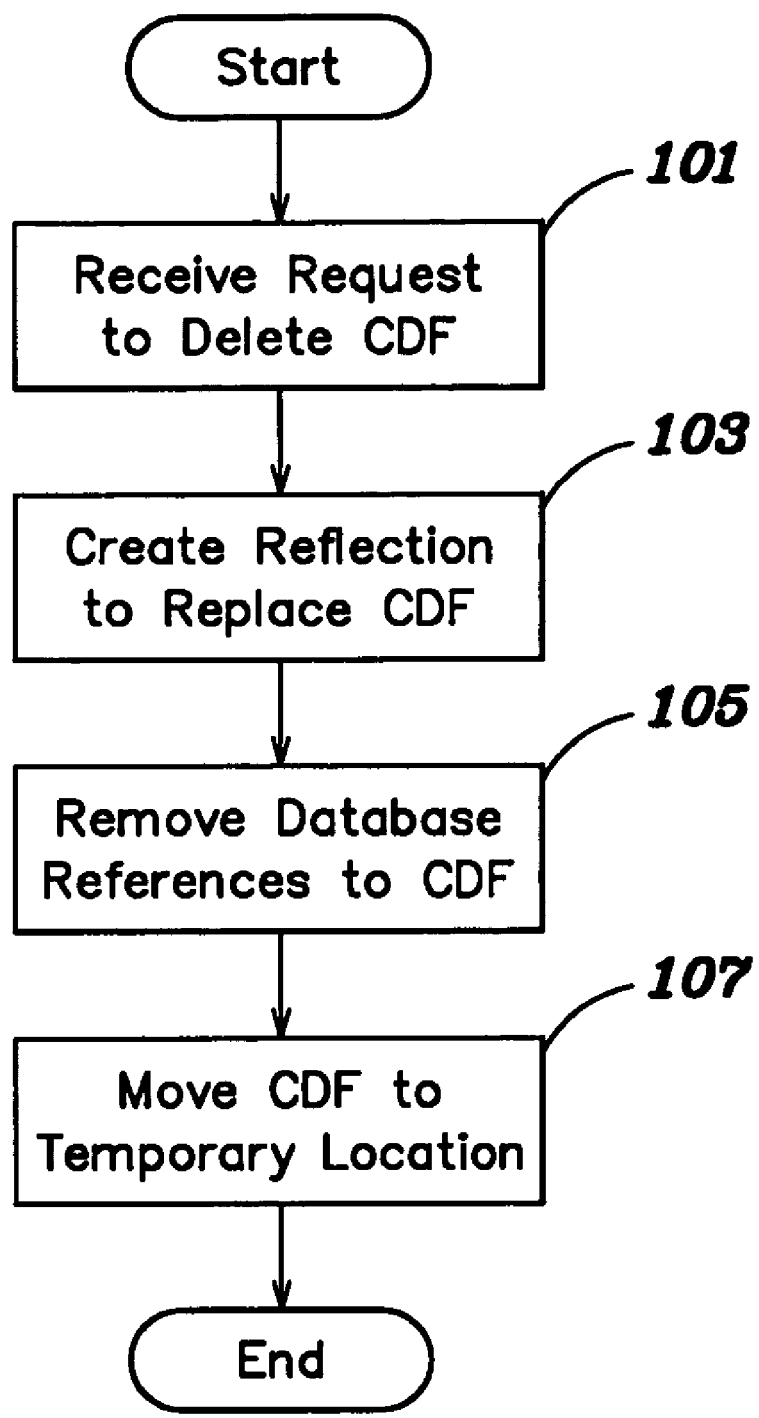
FIG. 1 is a flow chart illustrating a process for deleting a content unit from a storage system while leaving a reflection of the content unit, in accordance with one illustrative embodiment of the invention.

Applicants have appreciated that prior art storage systems may allow deletion of data stored thereon, but may provide limited or no capability to track deletions or to recover unintentionally deleted data. Thus, it may be difficult or impossible for a system administrator to determine when data was deleted, why the data was deleted, and who deleted it.

An example of a particular type of storage system is a content addressable storage (CAS) system that receives and processes requests to delete units of content identified by content addresses. CAS is a technique by which a unit of content stored on a storage system is accessed using an address that is derived from the content of the unit of content. As an example, the content unit may be provided as an input to a hashing function which generates a hash value that can be used as the content address for the unit of content. An example of a hashing function suitable for generating content addresses is the message digest 5 (MD5) hashing algorithm. When a host computer sends a request to a CAS system to retrieve a unit of data, the host provides the content address (e.g., hash value) of the unit of content. The storage system then determines, based on the content address, the physical location of the unit of content in the storage system, retrieves the unit of content from that location, and returns the unit of content to the host computer. Exemplary CAS systems are described in greater detail in the patent applications listed in Table 1 below, each of which is hereby incorporated by reference in its entirety.

CAS systems may store and manage content units in numerous ways. In the exemplary systems described in the applications in Table 1, content units may be stored as files in a file system and various databases may be used to manage the content units and track the storage location of content units on the CAS system. When the CAS system receives a request to delete a particular content unit, it may remove the file associated with that content unit from the file system and delete the references to the content unit in the CAS system databases. Thus, when the CAS system receives subsequent requests to read the content unit, the CAS system will not be able to locate and retrieve the content unit (despite the fact that the actual content data may still be stored in the storage system, e.g., on disk, when the CAS system uses disk storage). Conventional CAS systems do not log the deletion or create an audit trail to allow subsequent tracking of the deletion.

In addition, Applicants have recognized that in prior art CAS systems where units of content are mirrored on a CAS system, a content unit that has been deleted may undesirably be regenerated by the CAS system. This situation may occur, for example, when the CAS system is a distributed storage system. A distributed storage system is one that includes a plurality of independent nodes, each with its own processing resources, that are coupled together (e.g., by a communications network) and operate together to provide storage system functionality. In some of the exemplary CAS systems described in the applications in Table 1, the independent nodes may include access nodes which process access requests and storage nodes which store data. When a content unit is stored on one of the storage nodes, the content unit may be mirrored to another storage node so that a mirrored copy of the content unit exists in case the primary storage node fails. However, if one of the storage nodes that stores a content unit is offline (e.g., due to temporary failure) when the CAS system receives a request to delete a content unit, the content unit may not be deleted from that storage node. The CAS system may have a background process that controls the replication process and ensures that content units are replicated. Thus, when the storage node comes back online, the background process that checks to ensure content units are mirrored may determine that the content unit is not mirrored and may create a mirror copy of the content unit on a different storage node and repopulate the CAS systems databases with information pertaining to the content unit. Consequently, the CAS system may return the content unit in response to future read requests, even though a delete request for the content unit was received and processed.

In addition, a CAS system may be configured to replicate data to a remote CAS system (i.e., to mirror content units to the remote CAS system). Thus, any write request received by a local CAS system may be replicated to a remote CAS system (e.g., so that a mirror image of the CAS system exists in case of catastrophic failure). However, Applicants have appreciated that delete requests may not be replicated. That is, when a delete request for a content unit is processed by a local CAS system, the content unit is only deleted from that CAS system and is not processed by the remote CAS system. Thus, if a content unit is stored on both the local and remote CAS systems, a delete request for the content unit may result in deletion of only one copy of the content unit, so that one or more copies of the unit may still exist.

Additionally, Applicants have appreciated that some prior art CAS systems cannot guarantee replication of a content unit before it is deleted. That is, for example, a user may have a local CAS system configured such that every content unit that is stored thereto is archived to a remote CAS system. The user may desire that when a content unit is deleted from the local CAS system, the content unit is not deleted from the remote CAS system, so that the remote CAS system stores every content unit written to the local CAS system, regardless of whether the content unit is still stored by the local CAS system. However, replication may occur asynchronously. That is, a content unit that is stored to the local CAS system may not immediately be replicated to the remote CAS system. Thus, before a content unit is replicated to the remote CAS system, the local CAS system may receive a delete request for the content unit and delete it. As a result, the content unit may be deleted from the local CAS system and may never be replicated to the remote CAS system, as intended.

Applicants have further appreciated that in prior art CAS systems, the amount of storage space that is freed by a deletion is not logged. Thus, it is difficult to determine how much storage space is available on the CAS system. For example, the amount of storage capacity available may be determined by keeping a running tally of the total size of all content units written to the storage system and subtracting this number from the total available capacity. However, Applicants have appreciated that when a content unit is deleted, the size of the content unit is not added back to the total available capacity to account for the amount of storage space freed by the deletion.

Various embodiments of the invention address some of these limitations of prior art storage systems. However, it should be appreciated that every embodiment of the invention does not necessarily overcome all of these limitations. Indeed, embodiments of the invention may address some, all, or none of the above-discussed prior art limitations.

One embodiment of the invention is directed to tracking the deletion of content units on a storage system so that a record exists relating to the deletion. Such a record can be stored in any suitable manner, as the present invention is not limited in this respect. In one embodiment, when the storage system receives a request to delete a content unit, the storage system may create another content unit, referred to herein as a reflection, to replace the content unit and include information that may be used to track the deletion of the content unit. The reflection may be stored on the storage system (or elsewhere) and the content unit requested for deletion may be deleted, designated for deletion, or moved.

Figure 4:
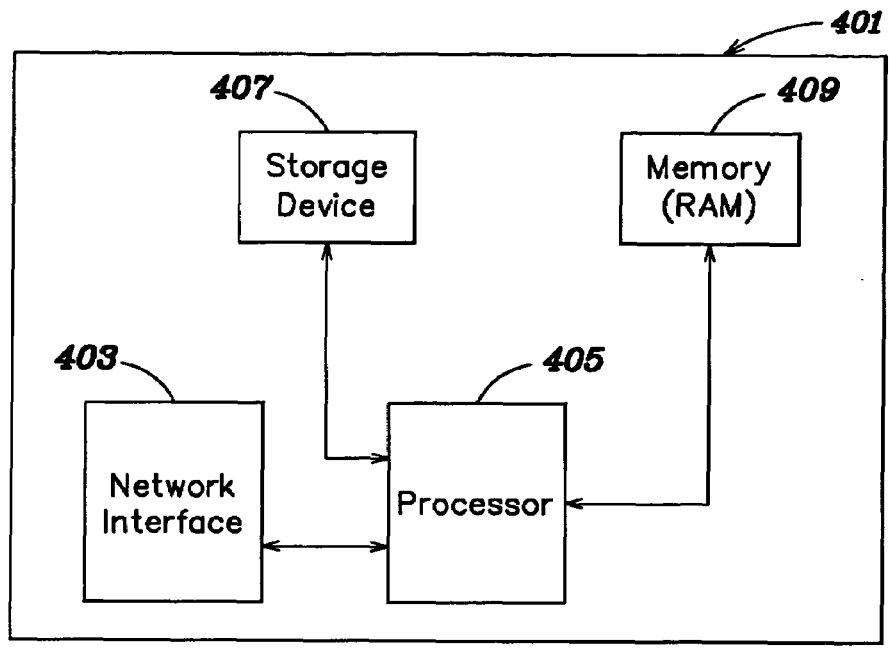
FIG. 4 is a block diagram of a storage system on which some embodiments of the invention may be implemented.

An example of a storage system on which some embodiments of the invention may be implemented is shown in FIG. 4. In FIG. 4, storage system 401 includes a processor 405, a network interface 403 which may be coupled to a network to allow storage system 401 to send and receive communications over the network, a memory 409 (e.g., random access memory), and a storage device 407 (e.g., a disk drive) on which data, such as content units, may be stored.

It should be appreciated that the storage system depicted in FIG. 4 is only one example of a storage system on which embodiments of the invention may be implemented and the invention is not limited in this respect, as storage systems on which embodiments of the invention may be implemented may differ in material respects from the storage system depicted in FIG. 4. For example, in FIG. 4, storage system 401 includes only one storage device 407 and one processor 405. The invention is not limited in this respect as the storage system on which the invention is implemented may include any suitable number of storage devices and/or any suitable number of processors. In addition, the storage system may be a distributed storage system (described above in greater detail) that includes a number of independent nodes, each of which includes separate storage devices and processing resources.

Figure 2:
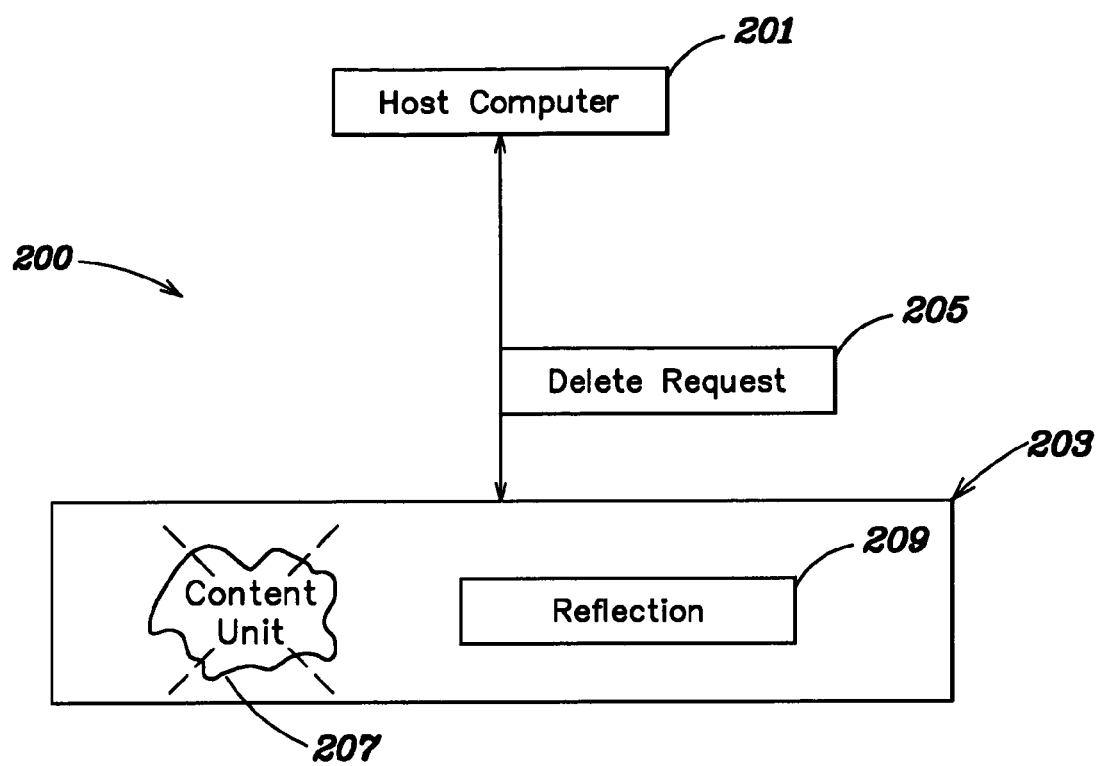
FIG. 2 is a diagram illustrating the processing of a delete request and the creation of a reflection by a storage system, in accordance with one illustrative embodiment.

An example of the processing of a delete request is shown in FIG. 2. In FIG. 2, computer system 200 includes a host computer 201 and a storage system 203 that stores a content unit 207. The storage system may be any type of storage system. In one embodiment, the storage system 203 may be a CAS system taking any of the forms described in the applications listed in Table 1. However, the present invention is not limited in this respect and can be used with storage systems of other types. In response to a request 205 to delete content unit 207 a reflection 209 may be created (e.g., by the storage system 203) that identifies content unit 207 and may include additional information about content unit 207 and its deletion.

The reflection may include any suitable information. For example, the reflection may include a portion (or all) of the content of the content unit to be deleted, information identifying the content unit to be deleted, and/or audit information. The audit information may include, for example, the time of deletion of the content unit, the user or application program that generated the request to delete the content unit, the network address of the computer that generated the request to delete the content unit, the size of the content unit to be deleted, and/or any other suitable information.

In one embodiment, the reflection may also include a flag that indicates that the reflection is a reflection and/or not an actual content unit. The flag may be included in the reflection in any suitable way, as the invention is not limited in this respect. For example, the flag may be part of the content of the reflection. In embodiments of the invention where the reflection is stored on the storage system as a file in a file system, the flag may be part of the file name of the reflection, but the embodiment directed to storing the reflection is not limited in this respect. In embodiments of the invention implemented on a CAS system, the reflection may be assigned a content address computed, at least in part, from the content of the reflection. The flag indicating that the content unit is a reflection may form a part of the content address of the reflection. The CAS system may store content units as files in a file system and use the content address of the content unit as the file name (or part of the file name) of the file for the content unit. In this respect, the flag indicating that a content unit is a reflection may be located in the content address of the reflection and the file name of the file for the reflection. It should be appreciated that the embodiment directed to use on a CAS system is not limited to use on a CAS system that employs a file system to store content units and/or reflections. Indeed, the CAS system may store content units in any suitable way as the invention is not limited in this respect. In this respect, the invention is not limited to placing the content address of a content unit in the file name of a file, as the content address may be associated with the content in any suitable way (e.g., using a database table).

The reflection may identify the content unit that it corresponds to so that it can be determined to which content unit the information stored in the reflection pertains and so that the information stored in the reflection can be found. A reflection of a particular content unit may identify the content unit in any suitable way. For example, the content of the reflection may include information identifying the content unit (e.g., the file name of the content unit when it is stored in a file system). In embodiments of the invention for use with a CAS system, the content address of the content unit may be included in the reflection. For example, the content address for the deleted content unit may be included in the content of the reflection or may be included in the content address of the reflection.

Figure 3:
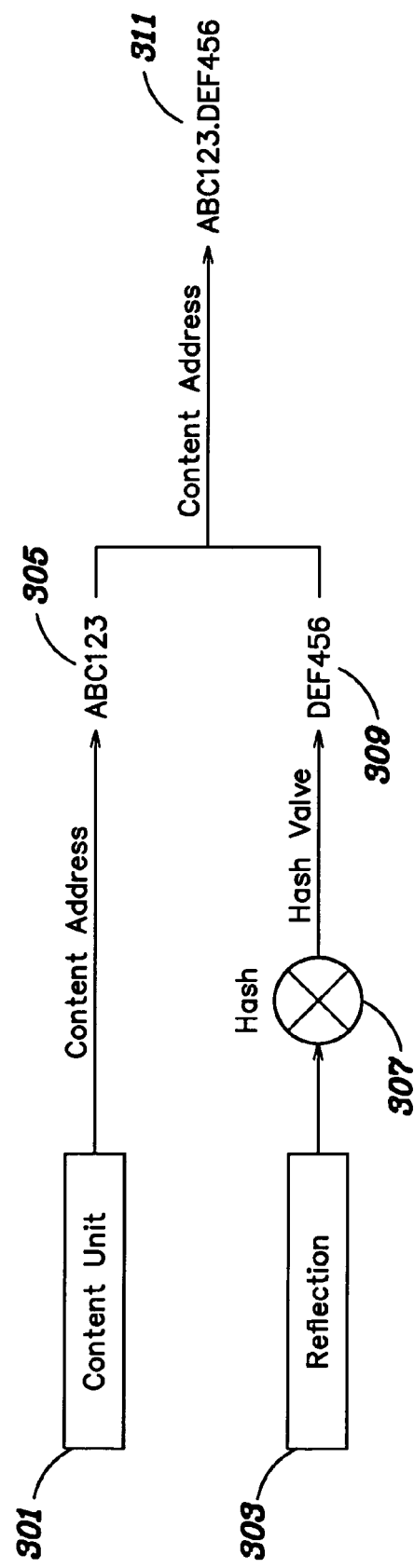
FIG. 3 is a diagram illustrating an example of a process for determining a content address of a reflection, in accordance with one illustrative embodiment for use with a content addressable storage system.

For example, the content address of the reflection may include a hash value generated, at least in part, from the content of the reflection and the content address of the content unit that the reflection corresponds to. The content address of the reflection may also include additional information, such as a timestamp that indicates the time (or the approximate time) at which the reflection was created, a guaranteed unique identifier (GUID) which is a unique value that may be included in the content address to guarantee that no two content units have the same content address, and/or any other suitable information. Thus, for example, as shown in FIG. 3, a reflection 303 may be hashed using a hash function 307, resulting in a hash value 309 of DEF456. The reflection may replace a content unit 301 having a content address 305 of ABC123. The content address 305 may combined with the hash value 309 to result in a content address 311 of ABC123.DEF456 for reflection 303. It should be appreciated that the content addresses provided in the example above are only examples of suitable formats for content addresses and the invention is not limited in this respect. That is, in the example above, the content addresses are ASCII character representations of a binary number. The content addresses need not be represented by ASCII characters, as the invention is not limited in this respect. In addition, in the example provided above the content addresses for content units include six characters and the content addresses for reflections include twelve characters. The invention is not limited in this respect as such content addresses may include any suitable number of characters (or binary digits).

In the embodiments wherein a hash of the content of the reflection is computed and stored, the integrity of the reflection may be validated at a later time. For example, when a reflection is accessed, the content of the reflection may be hashed and compared to the previously computed hash value of the content address. If the two values do not match, then the content of the reflection may have been corrupted or altered.

As discussed above, in response to a delete request for a content unit, the content unit may be deleted, designated for deletion, or moved to a different location. This may be done in any suitable way, as the invention is not limited in this respect. For example, if the content unit is stored as a file in a file system, the file corresponding to the content unit may be removed from the file system.

As mentioned above, one embodiment can be used with the types of CAS systems described in the applications in Table 1. Some of those CAS systems may store content in units termed blobs. A blob may be, for example, binary data, such as, for example, a patient x-ray, company financial records, or any other type of data. Each blob has at least one content descriptor file (CDF) associated with it. The CDF associated with a blob may include metadata for the blob and a reference to the blob (e.g., the content address of the blob). A CDF may reference multiple blobs or CDFs, so that the CDF includes multiple references and metadata for the referenced blobs. The CAS system may not allow direct deletion of blobs. That is, CDFs may be directly deleted, but requests to delete blobs may be denied by the CAS system. Blobs may be deleted by a background garbage collection process of the CAS system that determines if a blob is referenced by any CDFs. If the blob is not referenced by any CDFs, the blob may be deleted by the garbage collection process.

In accordance with one embodiment for use with a CAS system of the type just described that stores content as blobs and CDFs, a delete request may be processed as shown in FIG. 1. At act 101, a request to delete a CDF is received by the CAS system. The process proceeds to act 103, where the CAS system creates a reflection to replace the CDF. The reflection can be created in any suitable manner. As discussed above, the CAS system may include one or more databases that are used to manage content units and track the location of content units on the CAS system. In accordance with one embodiment of the invention, when the reflection is created, these databases may be updated to include the reflection, for example, to allow the reflection to be found in response to subsequent read requests.

Next, the process proceeds to act 105, where any references to the CDF in the databases of the CAS system may be removed. The process then continues to act 107, where the CDF is moved to a temporary directory in the file system. Once references to the CDF are deleted from the CAS systems' databases and the CDF is moved from its file system location, subsequent requests to access the CDF will fail. The CDF may be held in the temporary directory for garbage collection purposes. That is, the CAS system may maintain a reference count for each blob stored on the CAS system that indicates the number of CDFs referencing the blob. The background garbage collection process may periodically examine the temporary directory and may update the reference counts for blobs corresponding to CDFs found in the temporary directory. That is, the garbage collection process may go to the temporary directory in which the deleted CDF is located, determine the blobs that the CDF references, and decrement the reference counts of those blobs. The garbage collection process may then determine if any of the reference counts of the blobs referenced by the CDF are zero and may delete any blobs whose reference count is zero. Once processing for a CDF in the temporary directory is complete, the garbage collection process may remove the CDF from the file system.

As mentioned above, in one embodiment, in response to a delete request, a content unit may be deleted from the storage system on which it resides but be moved to another storage location to keep alive the possibility that the content unit could be retrieved. This may be done in any suitable way. For example, the reflection may be created to include information that indicates the location of the content unit on the other storage system. In one embodiment, the other storage system is a tape storage system. However, it should be appreciated the invention is not limited in this respect, as the storage location to which a deleted content unit is moved may be any suitable storage location, such as, for example, a location on a storage system that employs magnetic or optical disc storage devices.

As mentioned above, in some prior art systems in which content units written to a local CAS system are replicated to another remote CAS system, a delete request for a content unit to the local CAS system may not be replicated to the remote CAS system that also stores the content unit, so that the content unit is not deleted from the remote CAS system. In one embodiment of the invention in which a CAS system is configured to replicate content units to one or more remote CAS systems, when a content unit is deleted on the CAS system, the content unit may also be deleted on any remote CAS systems to which the content unit was previously replicated. This may be done in any suitable way. For example, reflections of deleted content units may be replicated to the remote CAS system(s). That is, when a CAS system receives a delete request for a content unit, the content unit may be deleted and a reflection may be created on the CAS system. The reflection may then be replicated to any other CAS system that stores a copy of the content unit. The other CAS system may be configured to, when it receives the replicated reflection, find the content unit that replaces it and delete it using any suitable technique (an example of which is described above in connection with FIG. 1).

In some situations, it may be desired that data deleted from a local CAS system not be deleted on a remote CAS system to which it was previously replicated, so that the remote CAS system may serve as an archive for the local CAS system (e.g., so that content units deleted from the local CAS system may be recovered). In such situations, when a reflection is replicated from the local CAS system to the remote CAS system, the remote CAS system may store the reflection, but may not delete the content unit associated with the reflection. Alternatively, in such situations, reflections may not be replicated from the local CAS system to the remote CAS system.

As discussed above, in situations where a local CAS system is configured to replicate content units to a remote CAS system, it may be desirable to ensure that a content unit stored to the local CAS system is replicated to the remote CAS system before it is deleted from the local CAS system. In one embodiment of the invention for use in systems configured to remotely replicate content units, content units may not be deleted from a local CAS system until they have been replicated to a remote CAS system. This may be done in any suitable way. For example, the local CAS system may be configured to delete a content unit only after the reflection for the content unit has been replicated. When a delete request for the content unit is received by the local CAS system, a reflection for the content unit may be created, but deletion of the content unit may be postponed. The replication process executing on the local CAS system may be configured to replicate content units in time order, so that content units created first are replicated first, and will eventually replicate the reflection for the content unit. Once the reflection for the content unit has been replicated, the content unit may be deleted from the local CAS system. In addition, because the content unit was created before the reflection, the content unit will have already been replicated to the remote CAS system. When the remote system receives the reflection, it may delete the content unit or maintain it, as described above.

In the examples above, CAS systems were designated as local CAS systems and remote CAS systems. The terms local and remote in the examples above are used merely to differentiate between a CAS system that receives a request (i.e., a local CAS system) and a CAS system to which the request is replicated (i.e., a remote CAS system). The terms local and remote, as used above, are not intended to imply a physical distance between the CAS systems. While local and remote CAS systems may indeed be located a great physical distance apart, the aspects of the invention that relate to techniques for use with replicated content units are not limited in this respect as the local and remote CAS systems may also be in the same room, or the same computer cabinet or rack.

Once a content unit is deleted from the storage system, subsequent requests for the content unit will not locate the content unit and access requests for the content unit will fail. Access requests may include, for example, read requests, exists requests, or delete requests. An exists requests is a request to the storage system to determine if a particular content unit exists (i.e., is stored) on the storage system. For example, the storage system may receive a request to read a previously-deleted content unit that identifies the content unit by its content address. The storage system may attempt to locate the content unit, based on its content address. Examples of techniques that may be used to locate a content unit on a storage system are discussed in the patent applications listed in Table 1. However, the invention is not limited to any of these examples, as the locating of a content unit on a storage system may be performed in any suitable way. In the examples above wherein content units are listed in a file system or database of the storage system after deletion, because the content unit is not listed in the file system or databases of the storage system, the content unit will not be located by the storage system. However, when searching based on the content address of the deleted content unit, the storage system may find the reflection of the content unit that was created when the content unit was deleted. This may be done in any suitable way. For example, when the reflection of the deleted content unit includes the content address of the deleted content unit, a search for the content address of the content unit will locate the reflection. When the storage system finds a reflection of the content unit and does not find the content unit itself, the storage system may response to the access request in any suitable manner, as the invention is not limited in this respect. For example, the storage system may indicate to the requesting entity that the content unit does not exist. Alternatively, the storage system may indicate that a reflection exists and/or may return the reflection.

Figure 5:
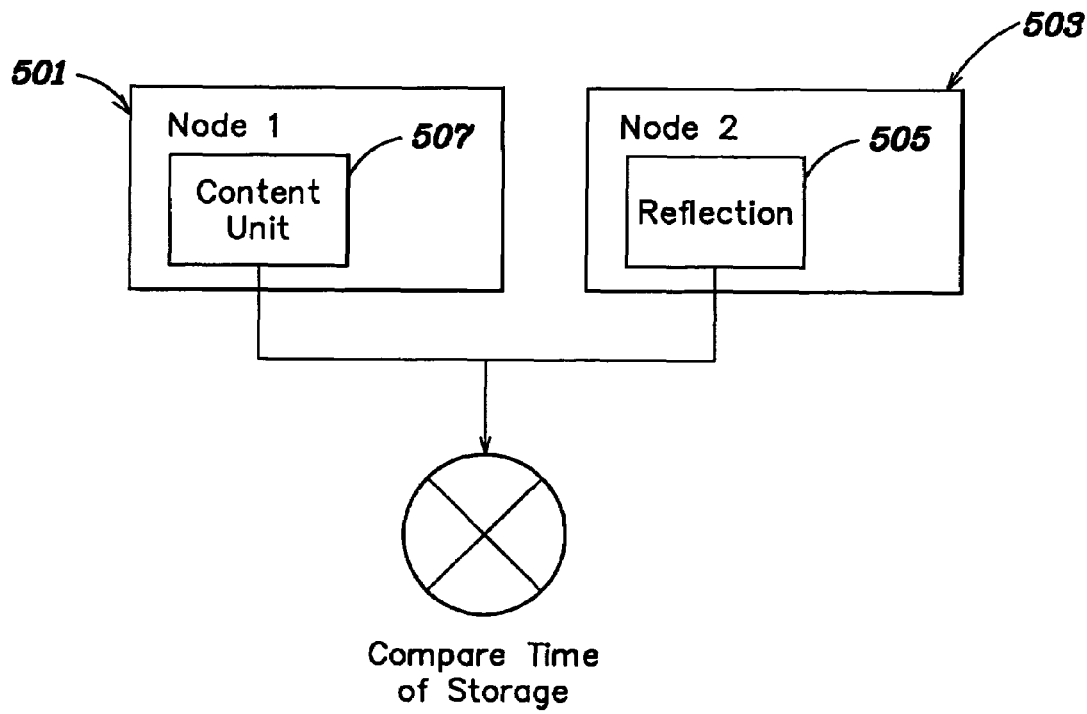
FIG. 5 is a diagram illustrating the use of a reflection in case of failure to properly delete a content unit, in accordance with one embodiment.

In some situations, the storage system may find both a reflection for a content unit and the content unit itself. This may occur, for example, in embodiments of the invention implemented on a distributed CAS system, where the CAS system stores two copies of a content unit on two different storage nodes. For example, as shown in FIG. 5, if a first of the two storage nodes (i.e., node 501) is offline when a delete request for the content unit is received, the content unit may be deleted from the second storage node (i.e., node 503). However, because node 501 is offline, the content unit may not be deleted from node 501. Further, a reflection 505 for the content unit may be created on node 503, but not on node 501. When node 501 later comes back online, in response to a subsequent request to access the content unit, the storage system may find both the reflection 505 that was created in response to the delete request and the content unit itself (i.e., content unit 507).

When both a reflection for a content unit and the content unit are found in response to an access request, the storage system may respond in any suitable manner. For example, as shown in FIG. 5, the storage system may determine which was stored on the storage system first. If the content unit was stored prior to the reflection, then the storage system may determine that an attempted deletion of the content unit failed (e.g., due to temporary failure of the storage node) and may, for example, delete the content unit or treat the content unit as if it does not exist. If the reflection was stored prior to the content unit, then the storage system may determine that the content unit was re-written to the storage system after the deletion request was processed and therefore should remain in existence on the storage system.

The storage system may determine which of the two content units was stored first in any suitable way, as the invention is not limited in this respect. For example, in one embodiment of the invention, the content address of a content unit may include a timestamp that indicates when the content unit was initially stored. The storage system may examine the timestamps of the content units (i.e., the original content unit and the reflection) to determine when each was stored. It should be appreciated that this is only one example of a way in which the storage system may determine the time at which a content unit was stored to the storage system and that the invention is not limited in this respect.

In one embodiment, the storage system may process query requests for reflections. A query request is a request to return information (e.g., content addresses) associated with content units (and/or the content units themselves) that meet the criterion or criteria specified in the request. For example, a query may request information relating to all content units deleted during a certain time range. In response, the storage system may identify all the reflections created during the time range (e.g., using the timestamps in the content address of the reflections) and return information associated with the deleted content units (e.g., the content addresses of the reflections and/or the reflections themselves).

Applicants have appreciated that when a storage system has been in operation for an extended period of time, the storage system may store a large number of reflections which occupy storage capacity in the storage system. Thus, in one embodiment of the invention, reflections themselves may be deleted (i.e., without being replaced by another reflection). This may be done in any suitable way. For example, the storage system may include a background garbage collection process that deletes reflections after they have been stored for a certain period of time. Alternatively, the storage system may allow reflections to be directly deleted by users of the storage system (e.g., using delete requests that identify the reflections by their content addresses).

In one embodiment, the deletion of reflections may be managed through the use of retention periods. As discussed in greater detail in application Ser. No. 10/731,790, entitled "Method And Apparatus For Data Retention In A Storage System," listed in Table 1, a retention period is a period of time associated with a content unit during which the content unit may not be deleted. A retention period may be associated with a reflection when the reflection is created and the storage system may be configured such that after expiration of the retention period, the storage system deletes the reflection. Alternatively, retention classes may be used to aid in the deletion of reflections. As discussed in greater detail in application Ser. No. 10/762,044, entitled "Methods And Apparatus For Modifying A Retention Period For Data In A Storage System," listed in Table 1, a retention class applies to a group of content units that all have the same retention period by virtue of being placed into the retention class. A retention class may be created for reflections and may have a certain retention period associated with it. When a reflection is created, it may be placed in the retention class, thereby assigning it a retention period. When its retention period has expired, the reflection may be automatically deleted by the storage system.

It should be appreciated that the use of retention periods is only one way in which the deletion of reflections may be managed and the invention is not limited in this respect, as the deletion of reflections may be managed in any suitable way. In addition, the invention does not require that reflections be deleted, as reflections may remain on the storage system without being deleted.

In one embodiment of the invention, a content unit may be restored for any purpose (e.g., if it is realized the content unit was unintentionally deleted and it is desired to recover the content unit). This may be accomplished in any suitable way. For example, when a content unit is deleted and a reflection is created to replace the content unit, the entire content of the content unit may be stored in the reflection. Thus, if it is desired to recover the content unit after its deletion, the content may be recovered from the reflection and the content unit may be rewritten to the storage system. In embodiments of the invention in which content units are stored as blobs and CDFs, reflections for both blobs and CDFs may be used to restore these content units, as the invention is not limited in this respect.

In accordance with one embodiment of the invention, a technique is employed that enables a determination of what was stored on the storage system at any given point in time. This may be done in any suitable way, as this aspect of the present invention is not limited to any particular implementation technique. For example, when used with the above-described reflections techniques wherein the entire deleted content unit may be stored in the reflection, to determine what content units were stored on the storage system at a particular point in time, a list of all content units, excluding reflections, currently stored on the storage system may be created. It may then be determined which content units were written to the storage system after the specified point in time (e.g., by examining the timestamps in the content addresses of all content units). These content units may be removed from the list. It may next be determined which content units that were written before the specified time were deleted after the specified time. This may be accomplished, for example, by finding all reflections with a timestamp after the specified date and determining if the content unit replaced by each of these reflections was written to the storage system before the specified date. The time at which a deleted content unit was written to the storage system may be determined in any suitable way (e.g., by examining the content address of its reflection). Because the content address of the reflection includes the content address of the deleted content unit, the timestamp from the content address of the content unit is included in the content address of the reflection. Thus, the time at which the deleted content unit was written to the storage system may be determined by examining this timestamp in the content address of the reflection. Any reflections of content units that were written before the specified point in time and deleted after the specified point in time may be added to the list. Thus, the list may include all content units that were stored on the storage system at the specified point in time.

In another embodiment, reflections may be used to make fixed content mutable. For example a content unit may be created with an indefinite retention period. After the creation of the content unit, it may be desired to alter its retention period (e.g., to three years). However, the retention period may be stored in the content unit itself and altering the retention period may alter the content of the content unit. Thus, the content unit may have a different content address after the retention period stored inside the content unit has been modified. For example, the original content unit with an indefinite retention period may have a content address of XYZABC. After the retention period is modified to three years, the content unit may have a content address of KLMNOP. Thus, when an access request is received for the content address XYZABC, no content unit may be found, as the content unit's content address has changed.

Figure 6:
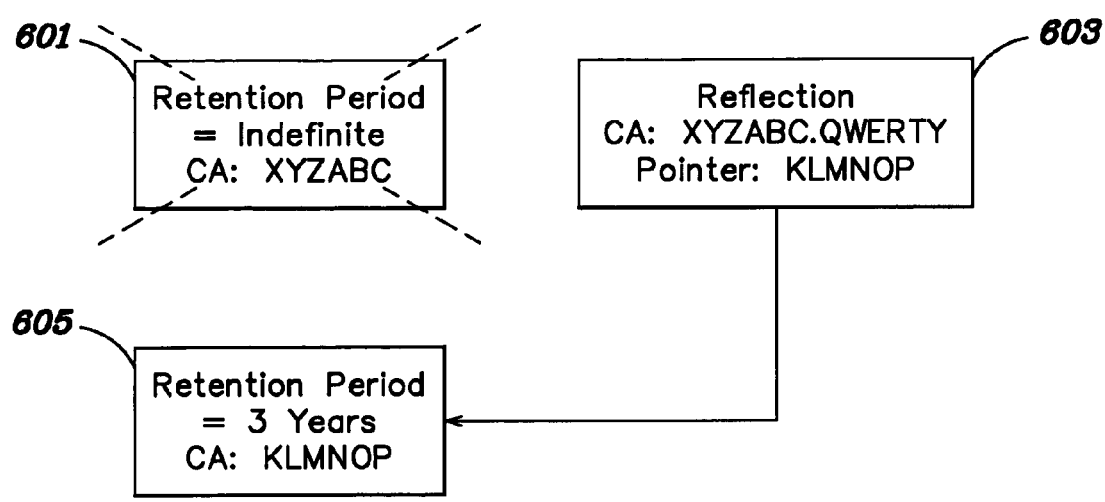
FIG. 6 is a diagram illustrating the use of a reflection to modify the retention period of content unit, in accordance with one embodiment.

In one embodiment of the invention, when the content unit is modified, resulting in a change in its content address, a reflection may be created and used as a pointer to the new content address for the modified content unit. The content address of the reflection may take any form. In one example, the content address for the reflection may be the original content address of the content unit, combined with a hash value of the reflection. Thus, for example, as shown in FIG. 6, a content unit 601 having an indefinite retention period may have a content address of XYZABC. Content unit 601 may be deleted and replaced with a reflection 603 that has a hash value of QWERTY (and a content address of XYZ-ABC.QWERTY) and a replacement content unit 605 that has the same content as content unit 601, but with a retention period of three years. The content address of content unit 605 may be KLMNOP. The content of reflection 603 may include a pointer to content unit 605 (e.g., by including the content address of content unit 605 in its content). Thus, for example, the content of the reflection may include KLMNOP. When a read request for the content address XYZABC is received, the storage system may find reflection 603 and determine that the new content address for the content unit is KLMNOP. The storage system may then find the content unit having the address KLMNOP and return this content unit to the requesting entity.

The above-described embodiments of the present invention can be implemented on any suitable system. Examples of suitable systems are described in the patent applications listed below in Table 1 (collectively "the CAS applications"), each of which is herein incorporated by reference. It should be appreciated that the systems described in these applications are only examples of systems on which embodiments of the present invention may be implemented, as the invention is not limited to implementation on a CAS system, and may be implemented on any suitable type of storage system.

The above-described embodiment in which reflections may be created for use in the modification of retention periods may be useful, for example, in situations where a retention period for a content unit is about to expire. That is, once the retention period for a content unit is about to expire the content unit may be deleted and there may be no way to find the content unit. However, by creating a replacement content unit that extends the retention period for the content unit and creating a reflection that points to the replacement content unit, the content unit may not be unintentionally deleted (or deleted otherwise) and permanently lost.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |

TABLE 1-continued

| Title | Ser. No. | Filing Date |
|---|---|---|
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | Attorney Docket No. E0295.70210US00 | Dec. 23, 2004 |
| Software System For Providing Content Addressable Storage System Functionality | Attorney Docket No. E0295.70228US00 | Dec. 23, 2004 |

TABLE 1-continued

| Title | Ser. No. | Filing Date |
| --- | --- | --- |
| Methods and Apparatus For Providing Data Retention Capability Via A Network Attached Storage Device | Attorney Docket No. E0295.70229US00 | Dec. 23, 2004 |
| Methods And Apparatus For Managing Storage In A Computer System | Attorney Docket No. E0295.70230US00 | Dec. 23, 2004 |
| Methods And Apparatus For Processing Access Requests In A Computer System | Attorney Docket No. E0295.70231US00 | Dec. 23, 2004 |
| Methods And Apparatus For Accessing Information In A Hierarchical File System | Attorney Docket No. E0295.70232US00 | Dec. 23, 2004 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

In various examples described above, content addresses were described to include alphabetic characters 'A'-'Z'. It should be understood that these content addresses were given only as examples, and that content addresses may include any alphanumeric character, series of bits, or any other suitable character, as the invention is not limited in this respect.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method comprising acts of:
in response to a request to delete from at least one storage system a first content unit that has content and a first retention period which specifies a period of time during which the first content unit is to be retained, the request being received before expiration of the first retention period, deleting the first content unit;
creating a second content unit to replace the first content unit, the second content unit comprising at least some of the content of the first content unit and having a second retention period different from the first retention period; and
creating a reflection for the first content unit, wherein the reflection identifies the second content unit as a replacement for the first content unit.

2. The method of claim 1, further comprising an act of:
storing the second content unit and the reflection on the storage system.

3. The method of claim 1, wherein the act of deleting the first content unit further comprises an act of:
ensuring that the act of creating the reflection of the first content unit is performed prior to deleting the first content unit.

4. The method of claim 1, wherein the act of deleting the first content unit further comprises:
ensuring that the act of creating the second content unit is performed prior to deleting the first content unit.

5. The method of claim 1, wherein the first content unit has an identifier and the reflection of the first content unit includes the identifier.

6. The method of claim 1, further comprising acts, performed after the act of deleting the first content unit, of:
receiving a request to access the first content unit;
in response to the request, locating the reflection for the first content unit;
using the reflection to locate the second content unit; and
returning the second content unit in response to the request.

7. The method of claim 1, wherein the content unit is stored in a file system on the at least one storage system and the act of deleting the first content unit further comprises an act of:
removing the first content unit from the file system.

8. The method of claim 1, wherein the first content unit is stored on at least one storage device of the at least one storage system and the act of deleting the content unit from the at least one storage system further comprises an act of:
overwriting a portion of the at least one storage device that stores the content for the first content unit.

9. The method of claim 1, further comprising, after the act of creating the second content unit, acts of:
receiving a request to delete the second content unit;

determining whether the second retention period has expired; and when it is determined that the second retention period has expired, deleting the second content unit.

10. The method of claim 9, further comprising an act of:

when it is determined that the second retention period has not expired, denying the request to delete the second content unit.

11. The method of claim 1, wherein the act of creating a second content unit comprises creating the second content unit to have a second retention period that expires after the first retention period.

12. The method of claim 1, wherein the act of creating a second content unit comprises creating the second content unit to have a second retention period that expires before the first retention period.

13. At least one computer readable medium encoded with instructions that, when executed on a computer system, perform a method comprising acts of:

in response to a request to delete from at least one storage system a first content unit that has content and a first retention period which specifies a period of time during which the first content unit is to be retained, the request being received before expiration of the first retention period, deleting the first content unit;

creating a second content unit to replace the first content unit, the second content unit comprising at least some of the content of the first content unit and having a second retention period different from the first retention period; and creating a reflection for the first content unit, wherein the reflection identifies the second content unit as a replacement for the first content unit.

14. The at least one computer readable medium of claim 13, further comprising an act of:

storing the second content unit and the reflection on the storage system.

15. The at least one computer readable medium of claim 13, wherein the act of deleting the first content unit further comprises an act of:

ensuring that the act of creating the reflection of the first content unit is performed prior to deleting the first content unit.

16. The at least one computer readable medium of claim 13, wherein the act of deleting the first content unit further comprises:

ensuring that the act of creating the second content unit is performed prior to deleting the first content unit.

17. The at least one computer readable medium of claim 13, wherein the first content unit has an identifier and the reflection of the first content unit includes the identifier.

18. The at least one computer readable medium of claim 13, wherein the method further comprises acts, performed after the act of deleting the first content unit, of:

receiving a request to access the first content unit;
in response to the request, locating the reflection for the first content unit;
using the reflection to locate the second content unit; and
returning the second content unit in response to the request.

19. The at least one computer readable medium of claim 13, wherein the content unit is stored in a file system on the at least one storage system and the act of deleting the first content unit further comprises an act of:

removing the first content unit from the file system.

20. The at least one computer readable medium of claim 13, wherein the first content unit is stored on at least one storage device of the at least one storage system and the act of deleting the content unit from the at least one storage system further comprises an act of:

overwriting a portion of the at least one storage device that stores the content for the first content unit.

21. The at least one computer readable medium of claim 13, wherein the method further comprises, after the act of creating the second content unit, acts of:

receiving a request to delete the second content unit;
determining whether the second retention period has expired; and
when it is determined that the second retention period has expired, deleting the second content unit.

22. The at least one computer readable medium of claim 21, wherein the method further comprises an act of:

when it is determined that the second retention period has not expired, denying the request to delete the second content unit.

23. The at least one computer readable medium of claim 13, wherein the act of creating a second content unit comprises creating the second content unit to have a second retention period that expires after the first retention period.

24. The at least one computer readable medium of claim 13, wherein the act of creating a second content unit comprises creating the second content unit to have a second retention period that expires before the first retention period.

25. A storage system comprising:

an input;
at least one controller, coupled to the input, that:
in response to a request received through the input to delete from at least one storage system a first content unit that has content and a first retention period which specifies a period of time during which the first content unit is to be retained, the request being received before expiration of the first retention period, deleting the first content unit, deletes the first content unit;
creates a second content unit to replace the first content unit, the second content unit comprising at least some of the content of the first content unit and having a second retention period different from the first retention period; and
creates a reflection for the first content unit, wherein the reflection identifies the second content unit as a replacement for the first content unit.

26. The storage system of claim 25, wherein the at least one controller:

stores the second content unit and the reflection on the storage system.

27. The storage system of claim 25, wherein the at least one controller:

ensures that the reflection of the first content unit is created prior to deleting the first content unit.

28. The storage system claim 25, wherein the at least one controller:

ensures that the second content unit is created prior to deleting the first content unit.

29. The storage system of claim 25, wherein the first content unit has an identifier and the reflection of the first content unit includes the identifier.

30. The storage system of claim 25, wherein the at least one controller, after deleting the first content unit:

receives a request to access the first content unit;
in response to the request, locates the reflection for the first content unit;
uses the reflection to locate the second content unit; and
returns the second content unit in response to the request.

31. The storage system of claim 25, wherein the content unit is stored in a file system on the storage system and the at least one controller:

removes the first content unit from the file system.

32. The storage system of claim 25, wherein the first content unit is stored on at least one storage device of the at least one storage system and the at least one controller:

overwrites a portion of the at least one storage device that stores the content for the first content unit.

33. The storage system of claim 25, wherein the at least one controller, after the act of creating the second content unit:

receives a request to delete the second content unit;

determines whether the second retention period has expired; and when it is determined that the second retention period has expired, deletes the second content unit.

34. The storage system of claim 33, wherein the at least one controller:

when it is determined that the second retention period has not expired, denies the request to delete the second content unit.

35. The storage system of claim 25, wherein the at least one controller creates the second content unit to have a second retention period that expires after the first retention period.

36. The storage system of claim 25, wherein the at least one controller creates the second content unit to have a second retention period that expires before the first retention period.

* * * * *